United States Patent
Kleinschnitz, Jr. et al.

(10) Patent No.: US 10,042,918 B2
(45) Date of Patent: Aug. 7, 2018

(54) OPTIMIZED PLACEMENT OF DATA

(71) Applicant: CA, Inc., New York, NY (US)

(72) Inventors: Donald Joseph Kleinschnitz, Jr., Islandia, NY (US); Debra Jean Danielson, Somerset, NJ (US)

(73) Assignee: CA, Inc., New York, NY (US)

( * ) Notice: Subject to any disclaimer, the term of this patent is extended or adjusted under 35 U.S.C. 154(b) by 0 days.

(21) Appl. No.: 15/062,794

(22) Filed: Mar. 7, 2016

(65) Prior Publication Data

US 2016/0188700 A1 Jun. 30, 2016

Related U.S. Application Data

(63) Continuation of application No. 13/856,264, filed on Apr. 3, 2013.

(51) Int. Cl.
*G06F 17/30* (2006.01)

(52) U.S. Cl.
CPC .. *G06F 17/30598* (2013.01); *G06F 17/30463* (2013.01)

(58) Field of Classification Search
CPC ................................................. G06F 17/30463
USPC ................. 707/692, 662, 728, 693
See application file for complete search history.

(56) References Cited

U.S. PATENT DOCUMENTS

| | | | | |
|---|---|---|---|---|
| 2006/0206520 | A1* | 9/2006 | Komamura | G06F 17/30011 707/107 |
| 2007/0174255 | A1* | 7/2007 | Sravanapudi | G06F 17/30707 707/3 |
| 2011/0137870 | A1* | 6/2011 | Feder | H04L 67/1002 707/662 |
| 2011/0295852 | A1* | 12/2011 | Wang | G06F 17/30867 707/728 |
| 2012/0296883 | A1* | 11/2012 | Ganesh | G06F 17/30315 707/693 |

* cited by examiner

*Primary Examiner* — Chelcie Daye
(74) *Attorney, Agent, or Firm* — Baker Botts L.L.P.

(57) ABSTRACT

The disclosed embodiments included a system, apparatus, method, and computer program product for optimizing the placement of data utilizing cloud-based IT services. The apparatus comprises a processor that executes computer-readable program code embodied on a computer program product. By executing that computer-readable program code, the processor extracts content from data and determines the context in which that data was generated, modified, and/or accessed. The processor also classifies the data based on its content and context, determines the cost of storing the data at each a plurality of locations, and specifies which of those locations the data is to be stored based on the classification of that data and the cost of storing that data at each of the plurality of locations.

15 Claims, 3 Drawing Sheets

OPTIMIZED PLACEMENT OF DATA

RELATED APPLICATIONS

This application is a Continuation of U.S. application Ser. No. 13/856,264, filed Apr. 3, 2013, the entire contents of which is incorporated herein by reference.

BACKGROUND

The present disclosure generally relates to data management. The disclosed embodiments relate more specifically to a system, apparatus, method, and computer program product for optimizing the placement of data utilizing cloud-based information technology (IT) services based on the characteristics of the data and the cloud-based IT services.

The volume of data generated by individuals, enterprises, and organizations is growing at a frenetic pace. Traditionally, such entities have purchased more local storage as the volume of data that needed to be stored increased. Such a response to increased storage needs was possible because the cost of storage devices was dropping almost as fast as the size of storage needs were increasing. The cost of such data storage, for example, was the amortized cost of the corresponding storage device.

More recently, however, entities have begun relying on cloud IT services for their data storage needs. Although such services eliminate the need to purchase and maintain storage devices locally, cloud IT service providers typically charge their tenants on a month-by-month basis. Accordingly, rather than being able to amortize the costs of data storage over a finite period of time, those costs will continue perpetually as long as the need for storage persists.

In addition, the growth of data generated by individuals, enterprises, and organizations has become so large and complex that it has become difficult to process that data utilizing conventional database management tools and data processing applications. That trend is referred to colloquially as "big data." And the size and complexity of such large data sets makes it difficult to effectively and efficiently manage that data. For example, it is difficult for entities to determine which data may be deleted because it is either duplicate or obsolete data. Accordingly, entities' storage needs are likely to continue to increase as those entities continue to generate more data. It also follows that the costs associated with storing that data on a cloud IT service will increase as those entities continue to generate more data. Those increased costs are particularly problematic when considered in view of their perpetual, month-by-month nature.

BRIEF SUMMARY

The present disclosure is directed to system, apparatus, method, and computer program product for optimizing the placement of data utilizing cloud-based IT services. The apparatus comprises a processor configured to execute computer-readable program code embodied on a computer program product. Executing the computer-readable program code comprises extracting content from a plurality of data; determining a context in which each of the plurality of data was at least one of generated, modified, and accessed; classifying each of the plurality of data based on the content extracted from that data and the context in which that data was at least one of generated, modified, and accessed; determining the cost of storing each of the plurality of data at each a plurality of locations; and specifying which of the plurality of locations each of the plurality of data is to be stored based on the classification of each of the plurality of data and the cost of storing that data at each of the plurality of locations.

BRIEF DESCRIPTION OF THE DRAWINGS

Aspects of the present disclosure are illustrated by way of example and are not limited by the accompanying figures.

In those figures, like reference numerals refer to like parts, components, structures, and/or processes.

DETAILED DESCRIPTION

Figure 1:
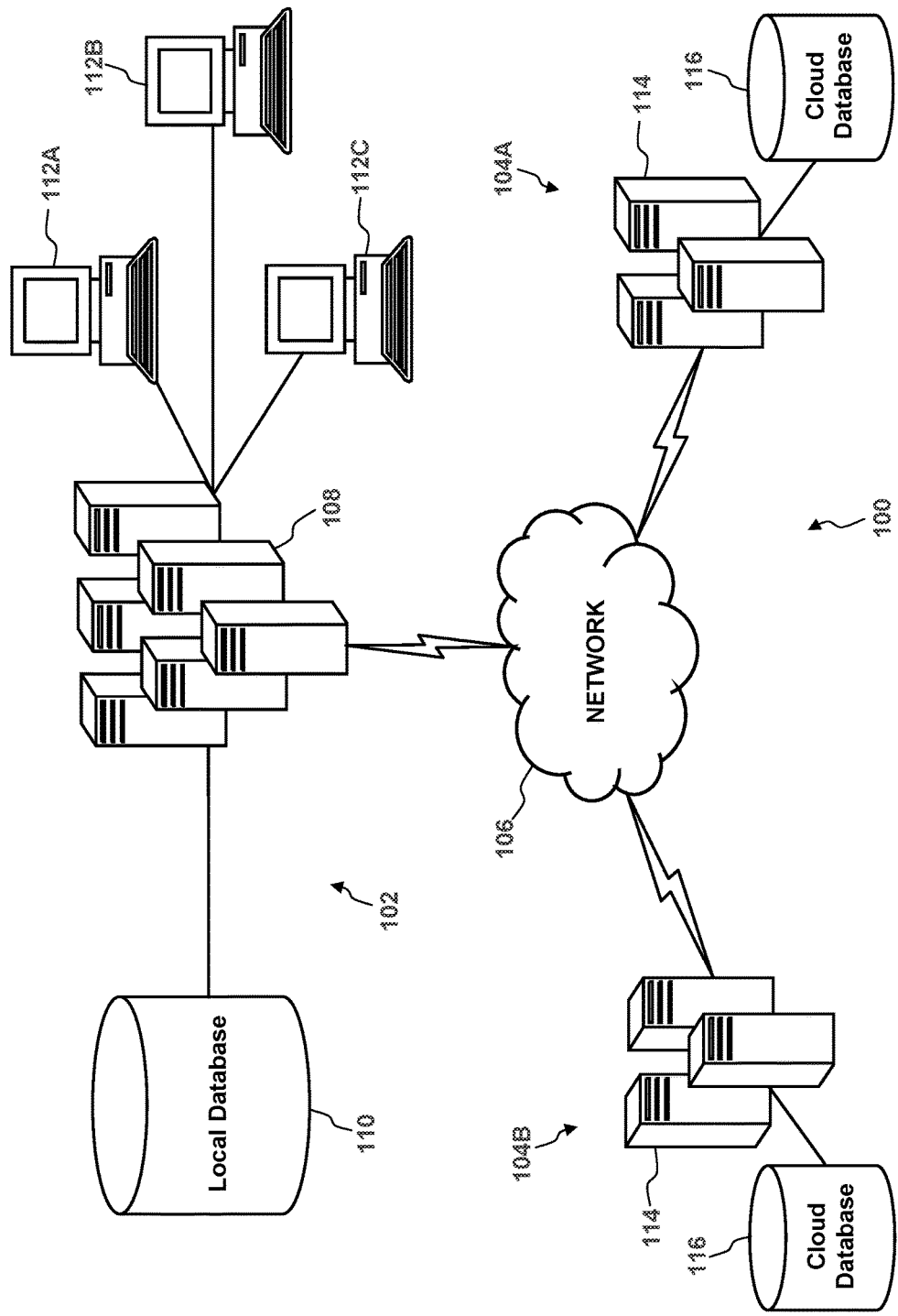
FIG. 1 is a schematic diagram illustrating an example of a cloud IT service solution according to a non-limiting embodiment of the present disclosure.

As will be appreciated by those of ordinary skill in the art, aspects of the present disclosure may be illustrated and described herein in any of a number of patentable classes or contexts that may include any new and useful process, machine, manufacture, or composition of matter, or any new and useful improvement thereof. Accordingly, aspects of the present disclosure may be implemented entirely as hardware, entirely as software (including firmware, resident software, micro-code, etc.), or by combining software and hardware implementations that may all generally be referred to herein as a "circuit," "module," "component," or "system." Furthermore, aspects of the present disclosure may take the form of a computer program product embodied in one or more computer-readable media having computer-readable program code embodied thereon.

Any combination of one or more computer-readable media may be utilized. The computer-readable media may be a computer-readable signal medium or a computer-readable storage medium. A computer-readable storage medium may be, for example, but not limited to, an electronic, magnetic, optical, electromagnetic, or semiconductor system, apparatus, or device, or any suitable combination of the foregoing. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable signal medium may be transmitted using any appropriate medium, including but not limited to wireless, wireline, optical fiber cable, radio frequency (RF), or any suitable combination thereof.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like; conventional procedural programming languages, such as the "C" programming language, Visual Basic, Fortran 2003, Perl, COBOL 2002, PHP, ABAP, dynamic programming languages such as Python, Ruby and Groovy; or other programming languages. Further, that compute program code may comprise or invoke one or more applications written in any combination of one or more of those programming languages. For example, the computer program code of the present disclosure may comprise or invoke various distributed computing applications, such as Hadoop and MapReduce.

The computer program code may be executed entirely on a user's computer, partly on the user's computer, as a stand-alone software package, partly on the user's computer and partly on a remote computer, or entirely on the remote computer or server. The remote computer or server may be connected to the user's computer through any type of network, including a local area network (LAN), a wide area network (WAN), or a cellular network. The connection also may be made to an external computer or server (e.g., through the Internet using an Internet Service Provider) in a cloud computing environment or offered as a service such as a Software as a Service (SaaS).

Aspects of the present disclosure are described herein with reference to schematic, block, and flow diagrams of systems, methods, apparatuses, and computer program products according to embodiments of the present disclosure. It will be understood that each block of the block and flow diagrams, and combinations of blocks in the block and flow diagrams, can be implemented by computer program instructions. Those computer program instructions may be provided to a processor of a general purpose computer, special purpose computer, or other programmable data processing apparatus to produce a machine, such that the instructions, which are executed via the processor of the computer or other programmable instruction execution apparatus, create a mechanism for implementing the functions/acts specified in the flowchart and/or block diagram block or blocks.

Those computer program instructions may also be stored in a computer-readable medium that, when executed, can direct a computer, other programmable data processing apparatus, or other devices to function in a particular manner, such that the instructions, when stored in the computer-readable medium, produce an article of manufacture that includes instructions which, when executed, cause a computer to implement the function/act specified in the flowchart and/or block diagram block or blocks. The computer program instructions also may be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The system, apparatus, method, and computer program product of the disclosed embodiments provide functionality for optimizing the placement of data utilizing cloud-based IT services based on the characteristics of the data and the cloud-based IT services. Those embodiments utilize a variety of different analytic and semantic techniques to determine the content, context, and history of data and to associate specific attributes with that data based on its content, context, and history. Those embodiments then may utilize those attributes to classify the data and determine the appropriate placement of that data (e.g., on-premise storage, selected cloud storage, or deletion) based on that classification and a variety of cost factors. As those classifications and/or cost factors change, so may the placement of the data. Accordingly, the disclosed embodiments dynamically and autonomically monitor and modify the placement of data as required to optimize such things as the cost, security, and availability of stored data.

Turning to the drawings, FIG. 1 illustrates a cloud IT service solution 100 according to a non-limiting embodiment of the present disclosure. The cloud IT service solution 100 comprises a tenant system 102 and two (2) service provider systems 104A and 104B that are in electronic data communication with each other via a network connection 106. For example, the tenant system 102 and the service provider systems 104A and 104B may be configured to communicate with each of the other via a WAN connection.

Further, the components 108-116 within the tenant system 102 and the service provider systems 104A and 104B may be configured to communicate with each other via a LAN connection, a wireless LAN (WLAN) connection, a WAN connection, a cellular network connection (e.g., a Global System for Mobile Communications (GSM) connection, a Code Division Multiple Access (CDMA) connection, a Long Term Evolution (LTE) connection, etc.), or any combination of two or more of those network connections 106. Similarly, any of the components 108-112 within the tenant system 102 also may communicate with any of the components 114 and 116 within the service provider systems 104A and 104B, and vice versa, via any combination of such network connections 106.

The tenant system 102 is maintained by an individual, enterprise, and/or organization that requires data storage. And each of the service provider systems 104A and 104B is maintained by a different cloud IT service provider that provides storage as a service (STaaS), either as primary storage, backup storage, staging storage, or some combination thereof. Although only one (1) tenant system 102 and two (2) service provider systems 104A and 104B are depicted in FIG. 1, it should be understood that the cloud IT service solution 100 depicted in FIG. 1 is illustrative only and may comprise any number of tenant systems 102 and/or service provider systems 104A and 104B, as well as various other systems (e.g., third-party software provider systems, mobile communications systems, etc.). It also should be understood that those tenant system(s) 102 and service provider systems 104A and 104B may comprise any number of each of their respective components 108-116, as well as additional components (e.g., modems, routers, load balancers, etc.).

As depicted in FIG. 1, the tenant system 102 comprises a plurality of local servers 108, a local database 110, and three (3) tenant graphical user interfaces (GUIs) 112A-112C. As also depicted in FIG. 1, each of the service provider systems 104A and 104B comprises a plurality of cloud servers 114 and a cloud database 116. The tenant system 102 may be configured as business solution that comprises various software applications that are configured to generate, modify, and access data as part of a business (e.g., email applications, scheduling applications, web browsing applications, word processing applications, etc.). And each of the service provider systems 104A and 104B may be configured to provide STaaS to the tenant system 102 on a subscription basis, wherein each of the service provider systems 104A and 104B may be configured to provide different levels of services and/or different subscriptions to the tenant system 102 in a self-service manner.

Each of the servers 108 and 114 within the cloud IT service solution 100 comprises a processor, a memory, and a network interface. The processor may include any number of suitable CPUs that are configured to execute computer program code embodied on the memory and to perform the various functions of those servers 108 and 114 described herein. The memory may include one or more types of memory (e.g., ROM, RAM, EEPROM, etc.) as required to store the computer program code executed by the processor and to support the execution of that code. And the network interface may include any number of suitable interfaces (e.g., modems, mobile browsers, wireless Internet browsers, etc.) that are configured to support communications with and between the various components 108-114 within the tenant system 102 and the service provider systems 104A and 104B, as well as with and between those systems 102, 104A, and 104B.

Each of the databases 110 and 116 within the cloud IT service solution 100 comprises memory that is configured to store data records, files, and other objects for access by a database management system (DBMS). More specifically, both the local database 110 and the cloud databases 116 are configured to store data that may be generated, modified, and/or accessed via the tenant system 102. For example, that data may be generated, modified, and/or accessed by users at the tenant GUIs 112A-112C that are sending and receiving emails with email applications, creating calendar entries with scheduling applications, viewing and/or creating web content with web browsing applications, and/or creating, modifying, and accessing documents with word processing applications. Accordingly, the tenant servers 108 may comprise a DBMS that is configured to store, access, and manage such data on both the local database 110 and the cloud databases 116.

Each of the GUIs 112A-112C within the tenant system 102 comprises a processor, a memory, an input device, an output device, and a network interface. The processor, memory, and network interface may be similar to those described above with respect to the servers 108 and 114. And the input device may include any number of suitable devices that are configured to receive input from a user (e.g., a keypad, a microphone, a camera, a retinal scanner, a print pad, an electronic receiver, a touch screen, etc.), while the output device may include any number of suitable devices that are configured to output data to a user in a meaningful manner (e.g., a display, a printer, a speaker, etc.). Accordingly, each of the GUIs 112A-112C may be any suitable network device with each of those components (e.g., a personal computer, a tablet computer, a personal digital assistant (PDA), a smartphone, etc.). Although not depicted in FIG. 1, each of the service provider systems 104A and 104B also may comprise one or more GUIs.

Figure 2:
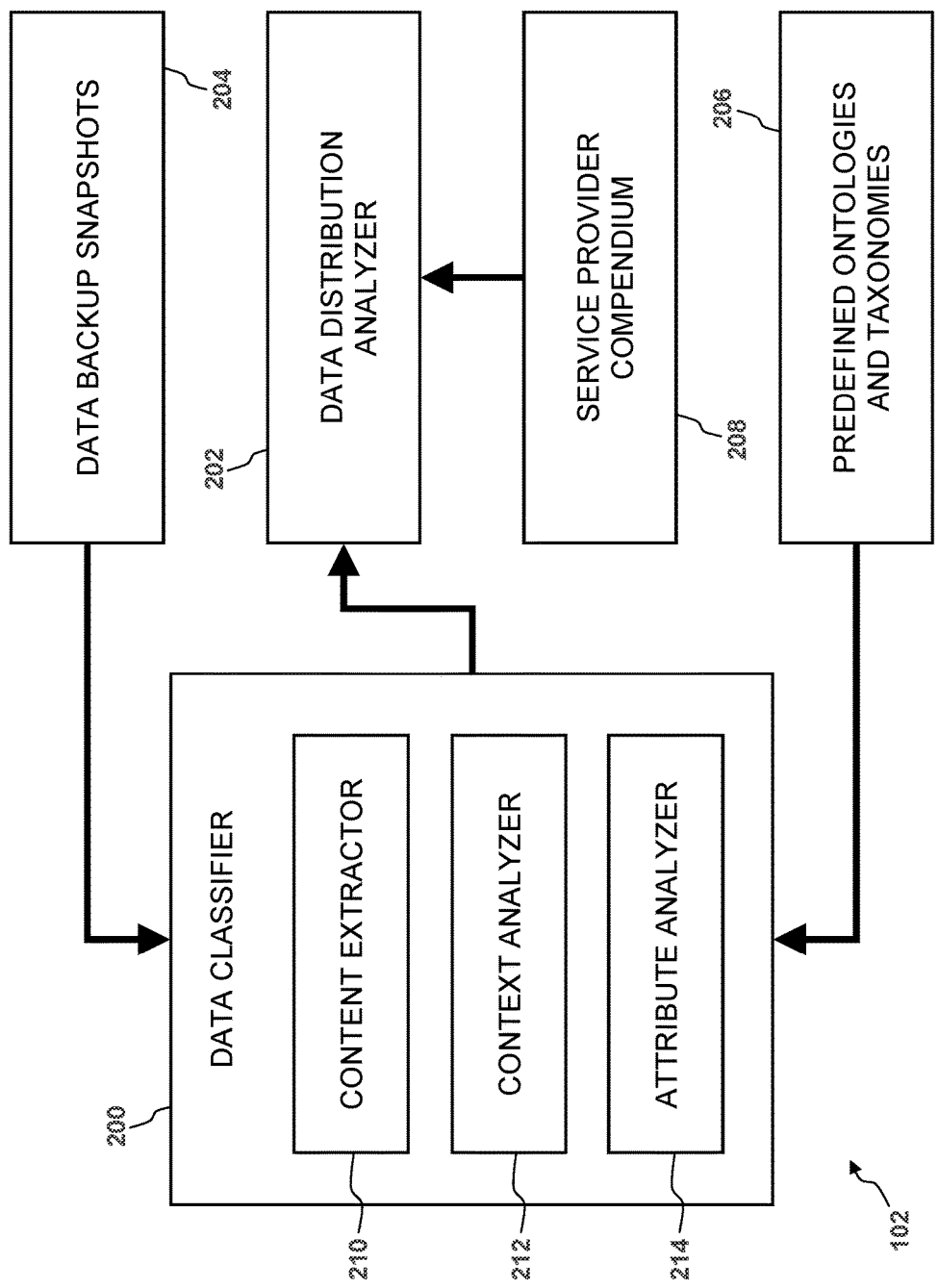
FIG. 2 is a block diagram illustrating a tenant system according to a non-limiting embodiment of the present disclosure.

Computer program code stored on and/or executed by one or more of the components 108-112 of the tenant system 110 may embody one or more modules that are configured to optimize the placement of the data generated at the tenant system 110 by utilizing local storage in conjunction with storage at the service provider systems 104A and 104B. As depicted in FIG. 2, for example, the tenant system 110 may comprise a data classifier 200, a data distribution analyzer 202, data backup snapshots 204, predefined ontologies and taxonomies 206, and a service provider compendium 208. The data classifier 200 is configured to extract information from data and to classify that data based on its content, context, and history utilizing the extracted information, the data backup snapshots 204, and the predefined ontologies and taxonomies 206. And the data distribution analyzer 202 is configured to determine whether and how to store that data utilizing the classifications assigned to that data by the data classifier 202 together with the service provider compendium 208. Although the data classifier 200 and the data distribution analyzer 202 are depicted as separate modules in FIG. 2, it should be understood that those modules 200 and 202 also may be provided as a single module or as three (3) or more modules.

The data classifier 200 comprises a content extractor 210, an attribute analyzer 212, and a context analyzer 214. The data distribution analyzer 202 comprises service level management and de-duping functionality. The data backup snapshots 204 comprise images of the data stored within the cloud IT service solution 100 at a plurality of different times, including data stored on each of the databases 110 and 116 and tenant GUIs 112A-112C. Those images also may encompass data stored on the service provider systems 104A and 104B. The predefined ontologies and taxonomies 206 comprise a set of data types, properties, and relationships that are defined by different sets of shared data characteristics. And the service provider compendium 208 comprises cost, availability, attribute, and configuration information for each of the services and levels of services provided by the service provider systems 104A and 104B.

The content extractor 210 is configured to extract information from data that may be utilized to classify and/or determine the context of that data. For example, the content extractor 210 may extract the text from the body of an electronic document, the content extractor 210 may extract tags associated with a digital image, and the content extractor 210 may extract actual content from digital images utilizing image recognition techniques. The content extractor 210 also may extract information that is associated with data, such as creation and edit dates, author and editor identities, and versioning information. That information may be utilized by the attribute analyzer 214 to determine the particular attributes of that data.

The context analyzer 212 is configured to determine the context in which data may have been or may be generated, modified, and/or accessed. Accordingly, the context analyzer 212 may utilize data association functionality to identify the different relationships that certain data has with different entities, systems, events, and/or other data based on whether that data is used in conjunction with or proximate to those different entities, systems, events, and/or other data. That data association functionality may utilize the data backup snapshots 204 to identify those relationships. It also may utilize other information to identify those relationships, such as calendar entries, search histories, and/or browsing histories.

For example, the context analyzer 212 may determine the context of an electronic document based on the author and recipients of an email to which that electronic document was attached, the content of the document and/or the email, and/or a related calendar entry. More specifically, the context analyzer 212 may associated the electronic document with each user identified as an author or recipient of the email. And the context analyzer 212 may associate the electronic document with a particular event identified in a calendar entry in a scheduling application utilized by any one of those users based on the content of the calendar entry and the content of the document and/or the email, both of which may be extracted by the content extractor 210. Accordingly, the context analyzer 212 also may utilize pattern-matching functionality to match the content of the calendar entry with the content of the document and/or the email.

By identifying the different relationships that certain data has with different users, events, and/or other data in that manner, the context analyzer 212 may identify the potential locations of duplicate data. Continuing with the foregoing example, the context analyzer 212 may identify the tenant GUIs 112A-112C utilized by each of the recipients of the email as potential locations of duplicate copies of the email and/or the document attached to that email. Or the context analyzer 212 may determine from a user's browser history that the user accessed a social media product (e.g., the FACEBOOK brand social media product, the TWITTER brand social media product, etc.) proximate to accessing an image file, based on which that social media product may be identified as a potential location of duplicate copies of the image file. Similarly, a social media product may identify other potential locations of duplicate copies of data. The content extractor 210 then may extract any tags that may be associated with that image file at that social media product, and the tenant GUIs 112A-112C utilized by any users that are tagged in that image file also may be identified as potential locations of duplicate copies of that image file.

In addition to identifying potential locations of duplicate copies of certain data, the context analyzer 212 also may identify users and/or events to which that data may be relevant and other data that may be related to that data. For example, the context analyzer 212 may identify users to whom certain data is relevant in the same manner that it identifies users that may be potential sources of duplicate data, such as by identifying an email as being relevant to a document attached to that email and identifying both the email and the attached document as being relevant to the author and the recipients of the email. And the context analyzer 212 may utilize its data association functionality to identify other data that is generated, modified, and/or accessed in conjunction with or proximate to certain data as being related to that certain data, particularly when the pattern-matching functionality of the context analyzer 212 also matches at least a portion of the content of that other data with the content of that certain data.

The attribute analyzer 214 is configured to determine the attributes of data utilizing the data backup snapshots 204, the predefined ontologies and taxonomies 206, the information extracted by the content extractor 210, and the context of the data determined by the context analyzer 212. For example, the attribute analyzer 214 may utilize the data backup snapshots 204 to determine whether certain data is seldom or never used and/or whether certain data has been replaced by a more recent version. The attribute analyzer 214 also may utilize natural language processing (NLP) to analyze the content of certain data and determine the types, properties, and relationships of that data based on the information extracted by the content extractor 210 and/or the predefined ontologies and taxonomies 206. Further, the attribute analyzer 214 may utilize pattern-matching functionality to identify duplicate data at the potential locations identified by the context analyzer 212 and data association functionality to determine that certain data has similar attributes to other data based on the relationships between those data identified by the context analyzer 212.

The attribute analyzer 214 classifies different data by associating that data with different attributes. Such attributes may include, for example, the confidentiality of the data, the relevance of the data, the uniqueness of the data, the purpose of the data, the value of the data, and the status of the data. Accordingly, different combinations of those attributes may be utilized to assign different classifications to different data. For example, data identified as being highly confidential and having significant value may be classified as high security/high value. And data identified as being marginally relevant but highly unique may be classified as low relevance/high uniqueness.

The confidentiality of data may be determined from the information extracted by the content extractor 210 and/or the predefined ontologies and taxonomies 206. For example, the content extractor 210 may extract the heading "Privileged and Confidential" from the subject line of an email, from which the attribute analyzer 214 may determine that the subject email and any attachments to that is highly confidential. Or the predefined ontologies and taxonomies 206 may define a document with certain financial language (e.g., "current assets," "current liabilities," etc.) as belonging to a data type that may be confidential if not yet made public, and the content extractor 210 may extract that financial language from the document together with language that indicates that the fiscal quarter described in that document has not yet occurred, from both of which the attribute analyzer 214 may determine that the subject document also is highly confidential.

The relevance of data may be determined from the predefined ontologies and taxonomies 206, the information extracted by the content extractor 210, and the relationships identified by the context analyzer 212. For example, the attribute analyzer 214 may determine the relevancy of data to each other utilizing NLP and/or pattern-matching functionality to determine the degree of similarity between the content of the related data identified by the context analyzer 212, wherein a greater degree of similarity will reflect greater relevance. Or the attribute analyzer 214 may determine that different data generated by different users is relevant to each other if the content extractor 210 extracts the same or similar information from that different data. The attribute analyzer 214 also may determine that the subject information is relevant to each those different users and that the different data are relevant to each other based on that same or similar information. And if the subject information also falls within any of the predefined ontologies and taxonomies 206, the attribute analyzer 214 also may determine that any other data that falls within the same ontologies or taxonomies 206 also is relevant to each of those different users and/or each of those different data.

The uniqueness of data may be determined from the information extracted by the content extractor 210 and/or the data backup snapshots 204. For example, the attribute analyzer 214 may determine the uniqueness of data utilizing its pattern-matching functionality and the information extracted by the content extractor 210 to identify information that does not appear anywhere else on the tenant system 102 as unique. Or the attribute analyzer 214 may determine the uniqueness of data utilizing its pattern-matching functionality and the data backup snapshots 204 to measure the degree to which data has been edited over time, wherein a greater amount of editing between different data reflects a greater amount of uniqueness.

The purpose of data may be determined from the information extracted by the content extractor 210 and/or the predefined ontologies and taxonomies 206. For example, the content extractor 210 may extract language from the body of a document that is personal in nature (e.g., "resume," "son," "daughter," etc.) and, based on that language, the predefined ontologies and taxonomies 206 may define that document as having a non-business related, or personal, purpose. Or the content extractor 210 may extract language from the body of a document that is related to the business of the entity that utilizes the cloud IT service solution (e.g., "earnings," "losses," "employee," etc.) and, based on that language, the predefined ontologies and taxonomies 206 may define that document as having a business related purpose.

The value of data may be determined from the information extracted by the content extractor 210, the data backup snapshots 204, and/or the predefined ontologies and taxonomies 206. That value may comprise the subjective, monetary value of the data and/or the objective, intangible value of the data to the entity that generated it. For example, the content extractor 210 may extract certain contract language (e.g., "this Agreement is entered into," "in consideration of the Agreement," etc.) from an electronic document, and the predefined ontologies and taxonomies 206 may define that document as a particular type of contract, from both of which the attribute analyzer 214 may determine that the subject document has a certain amount of intangible value to the entity that generated it. Similarly, the content extractor 210 may extract a file type and/or file description from a particular data (e.g., a purchased music file, a purchased software application, etc.), and the predefined ontologies and taxonomies 206 may define a particular monetary value for the corresponding data, from both of which the attribute analyzer 214 may determine that the subject data has a certain amount of monetary value. Or the attribute analyzer 214 may determine the value of data utilizing the data backup snapshots 204 to measure the amount that the subject data has been used, wherein a greater amount of use by different users reflects a greater amount of intangible value.

The status of data may be determined from the data backup snapshots 204, the information extracted by the content extractor 210, and/or the relationships identified by the context analyzer 212. For example, the attribute analyzer 214 may utilize the data backup snapshots 204 and versioning information extracted from data by the content extractor 210 to determine that certain data is obsolete because it has been replaced by a more recent version. Or similar to determining the intangible value of data, the attribute analyzer 214 also may utilize the data backup snapshots 204 to measure the amount that the subject data has been used, such that infrequent use will reflect not only a lesser amount of intangible value but also that the subject data may be deleted if it is not otherwise needed. The attribute analyzer 214 also may utilize the relationships identified by the context analyzer 212 to determine that certain data is replaceable when the context analyzer 212 determines that the data was downloaded from a third-party software provider system and the versioning information extracted from the data by the content extractor 210 identifies the data available on the third-party software provider system as being the same version as the data on the cloud IT service solution 100. The cost of replacing purchased data (e.g., music, videos, analyst reports, etc.) also may be utilized to determine if data is replaceable, as discussed below.

The data distribution analyzer 202 is configured to determine whether to store data locally at the tenant system 102, whether to store data remotely at one of the service provider systems 104A and 104B, or whether to dispose of data based on the service provider compendium 208 and the classifications assigned to that data by the attribute analyzer 214. The data distribution analyzer 202 may utilize service level management functionality to make those determinations. And when the data distribution analyzer 202 determines that duplicate data should be disposed of, it may utilize de-duping functionality to delete that data.

The data distribution analyzer 202 may delete data that is classified as duplicate, obsolete, unused, and/or replaceable. When duplicates of the same data reside of the cloud IT service solution 100, for example, the data distribution analyzer 202 may utilize its de-duping functionality to delete the instances of that data that reside in non-centralized locations and replace them with references that point to a single, remaining instance of the data in a centralize location. By deleting duplicate instances of data in that manner, the data distribution analyzer 202 may reduce the total amount of storage required in the cloud IT service solution 100 and slow the growth rate of new data, thereby reducing both the immediate and long-term costs of storage.

Although duplicate data generally may be deleted without considering other classifications that may be assigned to that data, those other classifications may be considered by the data distribution analyzer 202 before deleting obsolete, unused, and/or replaceable data. For example, older versions of the same electronic document may be classified as high value because the predefined ontologies and taxonomies 206 identify those types of electronic documents as archival and important for the purpose of record keeping. Unused data may be classified as high value for similar reasons. Unused data also may be classified as highly unique, such as when it is personalized for a particular user. Thus, rather than deleting such archival data from the cloud IT service solution 100, the data distribution analyzer 202 may designate that data for storage in an archival database either at the tenant system 102 or one of the service provider systems 104A and 104B. And rather than deleting such personalized data, the data distribution analyzer 202 may designate that data for local storage at the tenant GUI 112A, 112B, or 112C that corresponds to the user for whom the data was personalized.

Further, the data distribution analyzer 202 may designate replaceable data for storage at the tenant system 102 or one of the service provider systems 104A and 104B if the cost of replacing that data is greater than the cost of storing that data. For example, if a file was downloaded from a third-party software provider system outside of the cloud IT service solution 100 but the third-party software provider system charges a fee to download another instance of that file, the data distribution analyzer 202 may compare that cost to the cost of storing that file at the tenant system 102 or one of the service provider systems 104A and 104B. The cost of storing that file at the tenant system may be determined, for example, based on the amortized cost of existing equipment and/or equipment that may need to be purchased, and the cost of storing that file at the service provider systems 104A and 104B may be determined from the cost of purchasing storage at each of the service provider systems 104A and 104B, the latter of which may be obtained from the service provider compendium 208. And if the cost associated with downloading another instance of the file is greater than the cost associated with storing that file for a predetermined period of time, the data distribution analyzer 202 will designate that file for storage at the least costly of the tenant system 102 and the service provider systems 104A and 104B. Otherwise, the file may be deleted and re-downloaded to the cloud IT service solution 100 if it is needed again.

Storage costs also may be considered with respect to data classified as obsolete and/or unused. For example, data classified as obsolete and/or unused may be deleted any time the cost of storing that data outweighs the other factors. By way of more specific example, data classified as obsolete and/or unused data also may be classified as medium value. Accordingly, the data distribution analyzer 202 may delete that data when it determines that the cost of storing the data has reached a predetermined amount that outweighs the value of that data. A similar determination also may be made for other classifications of data.

Just as the data distribution analyzer 202 may designate a file for storage at the least costly of the tenant system 102 and the service provider systems 104A and 104B when the cost of storing that file is less than the cost of replacing that file, so too may the data distribution analyzer 202 designate other classifications of data for storage at the least costly of the tenant system 102 and the service provider systems 104A and 104B. Further, the data distribution analyzer 202 may optimize the placement of such data in a dynamic manner by continuously monitoring the service provider compendium 208 to determine if and when those costs might change as a result of changes in service level agreements and/or the service offerings at the service provider systems 104A and 104B. Such optimization also may be performed to ensure that the level of service associated with a particular cost is utilized as fully as possible.

For example, the classification assigned to a first set of data by the attribute analyzer 212 may indicate that the first set of data requires a high level of control and/or security. The attribute analyzer 212 also may assign a classification to a second set of data that indicates that the second data set is of low value and/or is used less frequently than other data sets. Accordingly, the data distribution analyzer 202 may compare the cost of storing the first data set and the second data set at the tenant system 102 with the cost of storing that same data at a service provider system 104A or 104B that provides a sufficient level of security. Thus, the data distribution analyzer 202 also may determine whether a particular service provider system 104A or 104B provides a particular level of service, such as a particular level of security.

Continuing with the foregoing example, the data distribution analyzer 202 may determine that the first service provider system 104A provides an adequate level of security but that it is less costly to store the first data set at the tenant system 102 because the cost of the level of service that provides that level of security is greater than the amortized cost of the equipment required to store that data at the tenant system 102. And because data that is of low value and/or that is used less frequently generally requires less security, and because less security generally corresponds to a level of service that costs less than other levels of service, the data distribution analyzer 202 also may determine that it is optimal to store the second set of data at the second service provider system 104B. Accordingly, the data distribution analyzer 202 may optimize the placement of data to minimize costs by designating the first data set for storage at the tenant system 102 and designating the second data set for storage at the second service provider system 104B.

Although the foregoing example is described primarily in terms of the costs of the services provided at each of the service provider systems 104A and 104B, the cost of moving the data also may be considered in determining whether and where to move that data. And although the foregoing example also is described primarily in terms of the level of security of the services provided at each of the service provider systems 104A and 104B, the security of the channel via which the data may be moved to each of those service provider systems 104A and 104B also may be considered in determining whether and where to move that data. Accordingly, the data distribution analyzer 202 may optimize the placement of data to minimize both overall costs and overall security risks, not just the costs and security risks associated with storage.

In addition, the data distribution analyzer 202 may move data from one service provider system 104A or 104B to another automatically as required to respond to and/or take advantage of certain service offerings. The data distribution analyzer 202 may move data from one service provider system 104A or 104B to another to maximize the utilization of the service purchased at that service provider system 104A or 104B. For example, a cloud IT service provider may offer a reduced rate for the first twelve (12) months of service as an incentive to purchase that particular service, in which case the data distribution analyzer 202 may automatically move all data from the corresponding service provider system 104A to another service provider system 104B at the end of that twelve-month period to prevent the specified cost increase. Similarly, a cloud IT service provider may provide storage in a tiered cost structure such that different costs are associated with different ranges of service (e.g., $50/month for the first 100 GB, $125/month for the second 100 GB, etc.), in which case the data distribution analyzer 202 may migrate data between different services as required to achieve a volume of data at each of the service provider systems 104A and 104B that prevents the cost from jumping to the next level at either of those service provider system 104A or 104B.

Cost and security, however, are not the only factors considered by the data distribution analyzer 202 when determining whether and where data should be stored. For example, control and access to data identified as being highly confidential and having significant value may override the cost factor in certain circumstances. Accordingly, the data distribution analyzer 202 may determine that it is optimal to store such data at the tenant system 102, rather than at one of the service provider systems 104A or 104B, to ensure that the subject data may be accessed even if the network connection 106 with the service provider systems 104A and 104B fails. Thus, the data distribution analyzer 202 may balance the business value of the data with the cost of storing that data.

Further, data that may otherwise have little business value may still be designated for storage due to its relevance to other data. For example, even if the information extracted from data by the content extractor 210 results in that data being classified as low value/low uniqueness, the context analyzer 212 may determine that the subject data frequently is utilized in conjunction with or proximate to other data that is classified as high value/high relevance. Accordingly, the attribute analyzer 214 may determine that subject data has medium relevance due to its strong relationship with the other data that is classified as high relevance, which may result in the data being designated for storage by the data distribution analyzer 202, rather than being deleted. By considering a plurality of classifications in that manner, some of which do not depend on the content of the data, the data distribution analyzer 202 may more effectively and efficiently determine whether and how data should be stored, even when the content of that data does not lend itself to such a determination.

Figure 3:
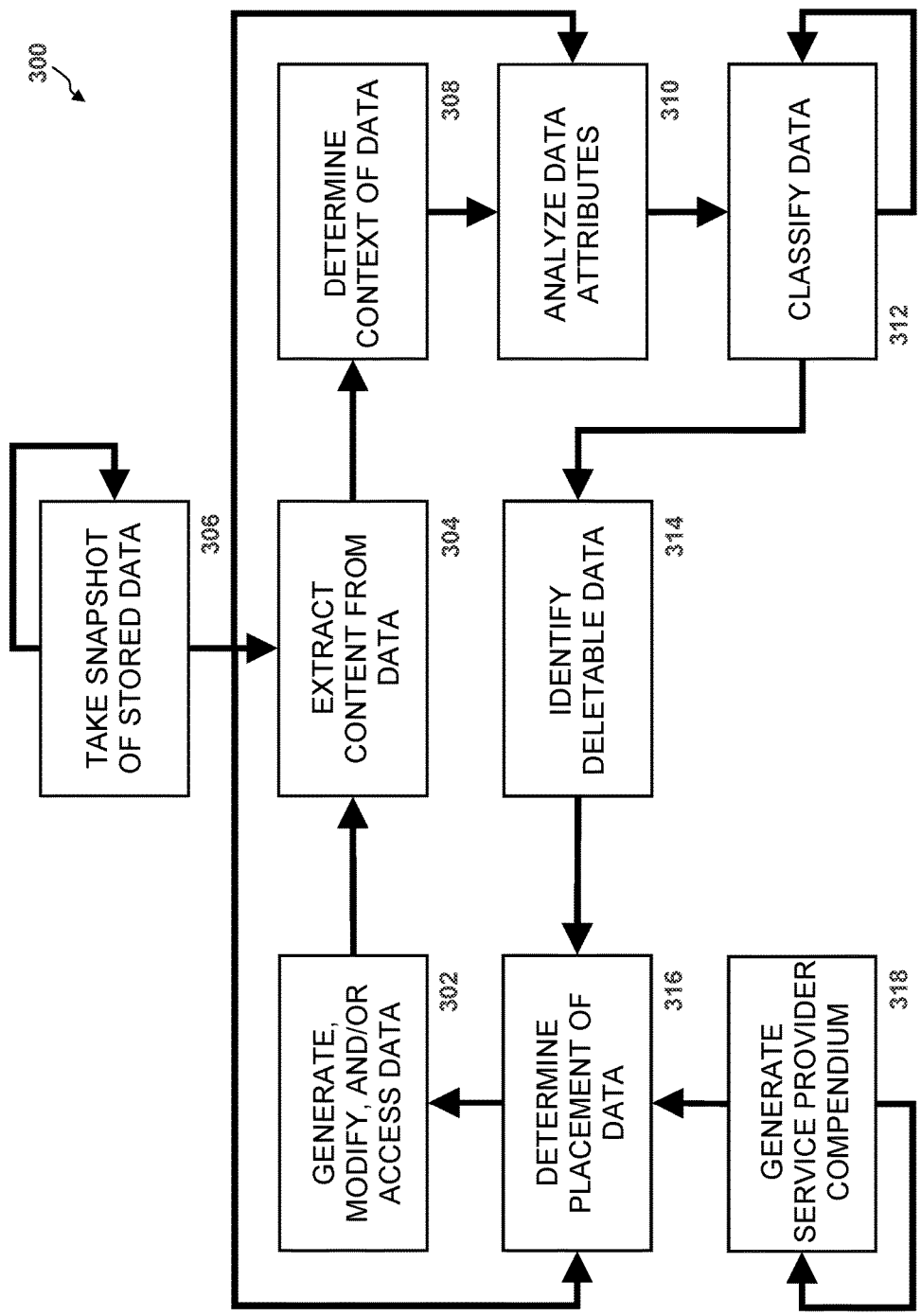
FIG. 3 is a flow diagram illustrating an example of a process for optimizing the placement of data according to a non-limiting embodiment of the present disclosure.

Turning to FIG. 3, a process for optimizing the placement of data 300 is depicted according to a non-limiting embodiment of the present disclosure. At step 302, a user at the tenant system 102 may generate, modify, and/or access data utilizing one of the tenant GUIs 112A-112C. For example, a user may generate data by composing an email, creating a calendar entry with a scheduling application, drafting an electronic document with a word processing application, downloading a file to the cloud IT service solution 100 from a third-party software provider system, or posting content to a social media product; a user may modify data by deleting a received email, editing a calendar entry, editing an electronic document, updating software, or updating content on a social media product; and a user may access data by opening an email, opening a calendar entry, opening an electronic document, opening a software program, or viewing content on social media product. Each of those events may result in a change in the content, context, or history of certain data. For example, accessing content outside of the cloud IT service solution 100 being stored, or cached, on one of the tenant GUIs 112A-112C. And even if data that is accessed already resides within the cloud IT service solution 100, such access may change the context and history of that data by identifying to whom the data may be relevant and the number of times that data has been viewed—the former of which may be utilized by the attribute analyzer 214 to determine the relevance of that or other data, and the latter of which may be utilized by the attribute analyzer 214 to determine the value of that data or other data.

At step 304, the content extractor 210 extracts content from the data that was generated, modified, and/or accessed at step 302. For example, the content extractor 210 may extract the subject line, author name, recipient name(s), time and date sent, and body text from an email; the content extractor 210 may extract the host name, invitee name(s), subject line, time and date, and body text from a calendar entry; the content extractor 210 may extract the author name, version number, creation and/or modification date, and body text from an electronic document; and the content extractor 210 may extract the identities of people tagged in a digital image, the text of a post, whether a user indicated interest or disinterest in certain content, and the identities of other people that may have commented or otherwise indicated interest or disinterest in the same content on a social media product. If the data extractor 304 already has extracted content from the subject data and that data has not changed since that content was extracted, the data extractor 304 may only extract the information required to determine that content already has been extracted from the subject data, such as versioning information and/or the time and date the data was created or edited. Thus, if a user accesses existing data at step 302 without modifying that data, at least some previously extracted content may be utilized to assign attributes to that data at step 308 so that the same content does not need to be extracted again at step 304.

It may be determined at step 304 that content already has been extracted from certain data by comparing that data to the data backup snapshots 204. Those data backup snapshots 204 may be generated continuously at step 306 in a cyclical manner, as depicted by the arrow extending from and returning to step 306 in FIG. 3. Thus, the most recently generated data backup snapshot 204 may be compared to any existing data that is accessed at step 302 to determine whether the data accessed at step 302 differs from a previously analyzed instance of that data. If the data accessed at step 302 does not differ from a previously analyzed instance of that data, the data extractor 304 need not extract any more content from that data than the content that is required to make that determination. The content extractor 304 also may extract all the pertinent content from that data at step 304, regardless of whether content already has been extracted from that data, so as to ensure that the subject data has not been modified from a previous instance and to enable the identification of any such modification.

At step 308, the context analyzer 212 the determines the context in which the subject data may have been generated, modified, and/or accessed. For example, the context analyzer 212 may associate an electronic document with each user identified as an author or recipient of an email to which that electronic document was attached. Or the context analyzer 212 may associate an electronic document with a particular event identified in a calendar entry in a scheduling application based on the content of the calendar entry and the content of the document. By identifying the different relationships that certain data has with different users, events, and/or other data in that manner, the context analyzer 212 may identify the potential locations of duplicate data. The context analyzer 212 also may identify users, events, and/or other data that is relevant to the subject data.

At step 310, the attribute analyzer 214 determines the attributes of data utilizing the content extracted by the content extractor 210 at step 302, the data backup snapshots 204 generated at step 306, the context of the data determined by the context analyzer 212 at step 308, and/or the predefined ontologies and taxonomies 206. For example, the attribute analyzer 214 may determine that an electronic document is an earnings report by utilizing NLP to identify certain financial language (e.g., "current assets," "current liabilities," etc.) among the content extracted by the content extractor 210 at step 302 and by utilizing the predefined ontologies and taxonomies 206 to determine that the subject financial language corresponds to an earnings report. The attribute analyzer 214 also may utilize the relationships between data determined by the context analyzer 212 at step 308 to identify other data that is related to that electronic document. For example, the context analyzer 212 may utilize pattern-matching functionality at step 308 to identify a calendar entry that provides the scheduled release date of earnings report based on similar language in those two data. And the context analyzer 212 may utilize data association functionality to identify any related documents to the earnings report, such as any spreadsheets utilized to generate the numbers provided in the earnings report, based on those related documents being generated, modified, and/or accessed concurrently with or proximate to the earnings report. Accordingly, the attribute analyzer 214 may identify each of those data as being relevant to each other and/or to a particular users or event, the relevance of which may be determined as a matter of degree based on factors such as commonality of content and/or frequency of concurrent or proximate use.

At step 312, the attribute analyzer 214 classifies different data by associating that data with the different attributes identified at step 310. Some of the attributes identified at step 310 may change over time. For example, if an electronic document is identified at step 310 as an earnings report with a release date that has not yet arrived, the attribute analyzer 214 may determine that the earnings report is highly confidential. After that release date has passed and the earnings report has been made public, the attribute analyzer 214 may change that attribute from highly confidential to public.

Accordingly, step 312 may be performed in a cyclical manner, as depicted by the arrow extending from and returning to step 312 in FIG. 3, such that the attribute analyzer 214 may identify any time-based change in an attribute as it occurs.

As described above, different combinations of attributes may be utilized by the attribute analyzer 214 to assign different classifications to different data at step 312. For example, in addition to being classified as high security due to its highly confidential nature, an earnings report also may be classified as high value due to its importance to the quarterly operations of the business that utilizes the cloud IT service solution 100. The resulting classification assigned to the subject data at step 312 therefore would be high security/high value.

As additional example of a classification that may be assigned to data at step 312, a classification of low relevance may be assigned to data that is not of particular relevance because it does not comprise any of the shared data characteristics that define the data types, properties, and relationships of the predefined ontologies and taxonomies 206. That data also may be of low relevance because the content extracted from that data at step 304 does not match the content of any other data and/or because no other data was generated, modified, and/or accessed concurrently with or proximate to the generation, modification, and/or access of that data. Nevertheless, those latter attributes also may result in a classification of high uniqueness. Accordingly, the subject data may be classified as low relevance/high uniqueness.

Although each of the foregoing examples is described in terms of two (2) classifications being assigned to certain data at step 312, it should be understood that more or fewer classifications also may be assigned to data at step 312. Nevertheless, the more classifications that are assigned to data at step 312, the more effectively and efficiently the data distribution analyzer 202 may optimize the placement of that data at step 316. For example, an electronic document that is personal in nature may be classified as low relevance/high uniqueness because it is not related to the business operations of the entity that utilizes the cloud IT service solution 100, while an electronic document that is created for a new project for the entity that utilizes the cloud IT service solution 100 also may be classified as low relevance/high uniqueness because that project is new and otherwise unrelated to previous projects. The former data may further be classified as personal based on the attributes identified by the attribute analyzer 214 at step 310, such as language in the body of the document that is personal in nature (e.g., "resume," "son," "daughter," etc.); and the latter data may further be classified as business, high security, and/or high value based on the attributes identified by the attribute analyzer 214 at step 310, such as language in the body of the document that is business related and forward looking (e.g., "press release," "announce," break ground," etc.).

Based on that information, the attribute analyzer 214 may classify the former data as low relevance/high uniqueness/personal at step 312, and classify the latter data as low relevance/high uniqueness/business at step 312. The latter data also may be classified as low relevance/high uniqueness/business/high value/high security at step 312 if it is determined at step 308 that the date for making the new project public has not yet occurred. As a result, the data distribution analyzer 202 may designate the former data for deletion or storage at one of the tenant GUIs 112A-112C, and the data distribution analyzer 202 may designate the latter data for storage at the tenant system 102 or one of the service provider system 104A or 104B that provides a higher level of security.

At step 314, the data distribution analyzer 202 identifies deletable data based on the status of that data determined by the context analyzer 212 and the attribute analyzer 214. For example, the context analyzer 212 may identify each of the recipients of an email as potential sources of duplicate copies of the email and any document attached to that email. The context analyzer 212 also may determine from the author's browser history that the author frequently utilizes some form of social media product and that the author has tagged one or more of the recipients of the email in a digital image on the social media product, based on which the context analyzer 212 may identify any other people tagged in the digital image as possible sources of the document attached to the email and/or related data. The attribute analyzer 214 then may utilize that information to identify duplicate data, such as at the GUIs 112A-112C that are associated with any users that received the subject email or that were tagged in that digital image. The data distribution analyzer 202 then may utilize its de-duping functionality to delete any duplicate data at step 314.

Also at step 314, the distribution analyzer 202 may determine that certain data may be deleted because it was classified as obsolete, unused, and/or replaceable at step 312. For example, the context analyzer 212 may determine from the data backup snapshots 204 that certain data has been replaced with a newer version and/or has not been used in a predetermined amount of time. Further, the context analyzer 212 may determine from a user's browser history that the user downloaded certain data from a third-party software provider system. If that data still is available from that third-party software provider system and the versioning information extracted from that data at step 304 matches the versioning data of the data that is still available, the attribute analyzer 212 may identify that data as replaceable at step 312. Then, based on any other classifications assigned to that data at step 312, the data distribution analyzer 202 may determine whether or not to delete such deletable files at step 314.

The deletion of replaceable data at step 314 may not occur immediately. Instead, it may occur only as storage space as required utilizing a lazy deletion technique. Data also may be deleted only when a certain cost threshold for storing it has been reached. Further, and as discussed above, there also may be instances in which the distribution analyzer 202 does not delete obsolete, unused, and/or replaceable data at step 314. For example, obsolete data may be classified as having high value due to its archival importance. Or unused data may be classified as having high uniqueness to a particular user. Accordingly, the distribution analyzer 202 may not delete that data at step 314. Instead, it may determine where to store that data at step 316.

At step 316, the data distribution analyzer 202 determines where to store data the data that is not deleted at step 314. As discussed above, that data may be stored locally at the tenant system 102 or remotely at one of the service provider systems 104A and 104B. The data distribution analyzer 202 makes that determination based on the classification assigned to that data at step 312 in conjunction with the service provider compendium 208. That service provider compendium 208 may be continuously updated at step 318 in a cyclical manner as cloud IT service providers update their service offerings and rates, as depicted by the arrow extending from and returning to step 318 in FIG. 3.

For example, the classification information generated by the attribute analyzer 212 may indicate that a first set of data requires a high level of control and/or security. The classification information generated by the attribute analyzer 212 also may indicate that a second data set is of low value and/or is used less frequently than other data sets. Accordingly, the data distribution analyzer 202 may compare the cost of storing that data at the tenant system 102 with the cost of storing that same data at one of the service provider systems 104A and 104B. The data distribution analyzer 202 then may store each data set at the least costly the tenant system 102 and the service provider systems 104A and 104B that also provides the requisite level of control and security.

The cost of storing the data at the tenant system 102 may be based, for example, on the monthly amortized cost of existing equipment and/or equipment that may need to be purchased, which may be compared directly to the monthly costs charged by the cloud IT service providers that maintains the service provider systems 104A and 104B. Cost, however, is not the only factor considered by the data distribution analyzer 202 when determining where data should be stored. For example, control and access to data identified as being highly confidential and having significant value may override the cost factor in certain circumstances. Accordingly, the data distribution analyzer 202 then may determine that it is optimal to store the first set of data at the tenants system 102 because the tenant system 102 is the only system that provides the requisite level of control, even if it would be less costly to store the data at one of the service provider systems 104A and 104B. And, because the second set of data does not need that level of control, the data distribution analyzer 202 may determine that it is optimal to store the second set of data at the second service provider system 104B because storage at that location is the least costly. Accordingly, the data distribution analyzer 202 may optimize the placement of data as required to balance the business value of the data with the cost of storing that data.

In addition, the data distribution analyzer 202 may dynamically respond to changes in the service offerings and/or rates as they change by moving data from one service provider system 104A or 104B to another as those changes occur. For example, a cloud IT service provider may offer a reduced rate for the first twelve (12) months of service as an incentive to purchase that particular service, or a cloud IT service provider may provide storage in a tiered cost structure such that different costs are associated with different ranges of service (e.g., $50/month for the first 100 GB, $125/month for the second 100 GB, etc.). In the former instance, the data distribution analyzer 202 may automatically move all data from the corresponding service provider system 104A to another service provider system 104B at step 316 when the end of that twelve-month period occurs. And in the latter instance, the data distribution analyzer 202 may migrate data between different services at step 316 as required to prevent the cost from jumping to the next level at any of those services.

Steps 302-318 may be repeated in a cyclical manner each time data is generated, modified, and/or accessed in the cloud IT service solution 100 because each such action may result in a change in the classification of that data and/or some other data. Such a change in classification, in turn, may result in a change in the placement of that data. Accordingly, the system, apparatus, method, and computer program product of the process for optimizing the placement of data 300 also is dynamic in that it automatically reacts to changes in data as they occur. Accordingly that process may autonomically optimize the placement of data in real time as data changes and as service offerings and/or rates change, thereby reducing the immediate and long-term costs associated with storing that data as well as eliminating the need to manually sift through that data to determine its placement.

The schematic, block, and flow diagrams in FIGS. 1-3 illustrate the architecture, functionality, and operation of possible implementations of systems, methods, apparatuses, and computer program products according to various aspects of the present disclosure. In that regard, each block in the flow and block diagrams may represent a module, segment, or portion of code, which comprises one or more executable instructions for implementing the specified logical function (s). It should also be noted that, in some alternative implementations, the functions noted in a block may occur out of the order noted in the figures. In FIG. 3, for example, two blocks shown in succession may, in fact, be executed substantially concurrently, or the blocks may sometimes be executed in the reverse order, depending upon the functionality involved. It will also be noted that each block of the block and flow diagrams, and combinations of blocks in the block and flow diagrams, may be implemented by special purpose hardware-based systems that perform the specified functions or acts, or combinations of special purpose hardware and computer instructions.

In addition, although each of the process steps 302-318 depicted in FIG. 3 is described as being performed on or by specific elements of the cloud IT service solution 100 depicted in FIG. 2 and the tenant system 102 in FIG. 3, it should be understood that those process steps 302-318 are not limited to being performed by those specific elements. Instead, the foregoing description of the process for optimizing the placement of data 300 is intended to be illustrative only, and the references to specific elements of the cloud IT service solution 100 depicted in FIG. 2 and the tenant system 102 in FIG. 3 are solely for the purpose of illustration. Thus, it should be understood that the process steps 302-318 depicted in FIG. 3 also may be performed by any other suitable element and/or device.

The terminology used herein is for the purpose of describing particular aspects of the disclosed embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The descriptions of the system, method, apparatus, and computer program product of the present disclosure have been presented for purposes of illustration, but are not intended to be exhaustive or to limit the system, method, apparatus, and computer program product to the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. An apparatus comprising:
   computer-readable program code embodied on a computer program product; and
   a processor configured to execute the computer-readable program code, wherein, when the processor executes the computer-readable program code, the apparatus is configured to:
   extract content from a plurality of data;
   determine a context in which each of the plurality of data was at least one of generated, modified, and accessed;
   assign a classification to each of the plurality of data based on the content extracted from that data and the context in which that data was at least one of generated, modified, and accessed;
   determine the cost of storing each of the plurality of data at each of a plurality of storage locations;
   specify at which of the plurality of storage locations each particular one of the plurality of data is to be stored based on the classification of the particular one of the plurality of data and the cost of storing the particular one of the plurality of data at each of the plurality of storage locations;
   distribute each particular one of the plurality of data to the specified storage location of the plurality of storage locations;
   periodically monitor each of the plurality of data at the specified storage location; and
   in response to detecting a change to the classification of one of the plurality of data, automatically specifying at which of the plurality of storage locations that data is to be stored based on the classification of that data and the cost of storing that data at each of the plurality of storage locations.

2. The apparatus of claim 1, wherein extracting content from the plurality of data comprises extracting at least one of text, versioning information, author identity, editor identify, recipient identity, edit data, and creation date from each of the plurality of data.

3. The apparatus of claim 1, wherein determining the context in which each of the plurality of data was at least one of generated, modified, and accessed comprises identifying a relationship that the data has with at least one of an entity, system, event, and other data based on whether the data was generated, modified, and accessed proximate to the at least one of an entity, system, event, and other data.

4. The apparatus of claim 3 wherein classifying each of the plurality of data based on the content extracted from that data and the context in which that data was at least one of generated, modified, and accessed comprises two or more of:
   classifying the data as relevant to the at least one of an entity, system, event, and other data proximate to which the data was at least one of generated, modified, and accessed;
   classifying the data as relevant to other data if the content extracted from the data is related to the content extracted from the other data;
   classifying the data similarly to any other data to which the data is classified as being relevant;
   classifying the data as having at least one of a type, property, and relationship if the content extracted from the data corresponds to at least one of a predefined ontology and a predefined taxonomy;
   classifying the data as a duplicate if another data from among the plurality of data is the same as the data;
   classifying the data as obsolete if versioning information extracted from the data indicates that the data is of an earlier version than a version of the data identified in a data backup snapshot; and
   classifying the data as replaceable if the data may be obtained from a location that is not among the plurality of storage locations at which the plurality of data may be stored.

5. The apparatus of claim 4, wherein data classified as duplicate is identified by searching one or more storage location from among the plurality of storage locations that is associated with the at least one of an entity, system, event, and other data that is identified as having a relationship with the data.

6. A method comprising:
   extracting content from a plurality of data located at a current location;
   determining, using a processor, a context in which each of the plurality of data was at least one of generated, modified, and accessed;
   classifying each of the plurality of data based on the content extracted from that data and the context in which that data was at least one of generated, modified, and accessed;
   determining, using a processor, the cost of storing each of the plurality of data at each of a plurality of storage locations;
   specifying at which of the plurality of storage locations each of the plurality of data is to be stored based on the classification of that data and the cost of storing that data at each of the plurality of storage locations,
   wherein specifying which of the plurality of storage locations particular data of the plurality of data is to be stored based on the classification of that data and the cost of storing that data at each of the plurality of storage locations occurs each time the particular data is at least one of generated, modified, and accessed and each time the cost of storing the particular data at each of the plurality of storage locations changes; and
   in response to determining the current location is different from the specified storage location, moving the data to the specified storage location.

7. The method of claim 6, wherein extracting content from the plurality of data comprises extracting at least one of text, versioning information, author identity, editor identify, recipient identity, edit data, and creation date from each of the plurality of data.

8. The method of claim 6, wherein determining the context in which each of the plurality of data was at least one of generated, modified, and accessed comprises identifying a relationship that the data has with at least one of an entity, system, event, and other data based on whether the data was generated, modified, and accessed proximate to the at least one of an entity, system, event, and other data.

9. The method of claim 8, wherein classifying each of the plurality of data based on the content extracted from that data and the context in which that data was at least one of generated, modified, and accessed comprises two or more of:
   classifying the data as relevant to the at least one of an entity, system, event, and other data proximate to which the data was at least one of generated, modified, and accessed;

classifying the data as relevant to other data if the content extracted from the data is related to the content extracted from the other data;
classifying the data similarly to any other data to which the data is classified as being relevant;
classifying the data as having at least one of a type, property, and relationship if the content extracted from the data corresponds to at least one of a predefined ontology and a predefined taxonomy;
classifying the data as a duplicate if another data from among the plurality of data is the same as the data;
classifying the data as obsolete if versioning information extracted from the data indicates that the data is of an earlier version than a version of the data identified in a data backup snapshot; and
classifying the data as replaceable if the data may be obtained from a location that is not among the plurality of storage locations at which the plurality of data may be stored.

10. The method of claim 9, wherein data classified as duplicate is identified by searching one or more location from among the plurality of storage locations that is associated with the at least one of an entity, system, event, and other data that is identified as having a relationship with the data.

11. A computer program product that is configured to be executed by a processor, the computer program product comprising:
computer-readable program code configured to extract content from a plurality of data;
computer-readable program code configured to determine a context in which each of the plurality of data was at least one of generated, modified, and accessed;
computer-readable program code configured to classify each of the plurality of data based on the content extracted from that data and the context in which that data was at least one of generated, modified, and accessed;
computer-readable program code configured to determine the cost of storing each of the plurality of data at each of a plurality of storage locations; and
computer-readable program code configured to specify which of the plurality of storage locations each of the plurality of data is to be stored based on the classification of that data and the cost of storing that data at each of the plurality of storage locations;
moving the plurality of data to the specified storage locations;
computer-readable program code configured to periodically monitor a service provider compendium associated with a particular data of the plurality of data; and
in response to detecting a change to the service provider compendium associated with the particular data of the plurality of data, automatically moving the particular data of the plurality of data to a new storage location of the plurality of storage locations based on the classification of that data and the cost of storing the particular data at each of the plurality of storage locations.

12. The computer program product of claim 11, wherein extracting content from the plurality of data comprises extracting at least one of text, versioning information, author identity, editor identify, recipient identity, edit data, and creation date from each of the plurality of data.

13. The computer program product of claim 11, wherein determining the context in which each of the plurality of data was at least one of generated, modified, and accessed comprises identifying a relationship that the data has with at least one of an entity, system, event, and other data based on whether the data was generated, modified, and accessed proximate to the at least one of an entity, system, event, and other data.

14. The computer program product of claim 13, wherein classifying each of the plurality of data based on the content extracted from that data and the context in which that data was at least one of generated, modified, and accessed comprises two or more of:
classifying the data as relevant to the at least one of an entity, system, event, and other data proximate to which the data was at least one of generated, modified, and accessed;
classifying the data as relevant to other data if the content extracted from the data is related to the content extracted from the other data;
classifying the data similarly to any other data to which the data is classified as being relevant;
classifying the data as having at least one of a type, property, and relationship if the content extracted from the data corresponds to at least one of a predefined ontology and a predefined taxonomy;
classifying the data as a duplicate if another data from among the plurality of data is the same as the data;
classifying the data as obsolete if versioning information extracted from the data indicates that the data is of an earlier version than a version of the data identified in a data backup snapshot; and
classifying the data as replaceable if the data may be obtained from a location that is not among the plurality of storage locations at which the plurality of data may be stored.

15. The computer program product of claim 14, wherein data classified as duplicate is identified by searching one or more location from among the plurality of storage locations that is associated with the at least one of an entity, system, event, and other data that is identified as having a relationship with the data.

* * * * *